Oct. 21, 1969    L. RUMP    3,474,229
HEATING ELEMENT FOR ELECTRIC CABLE FURNACES FOR
HEATING A FLOW OF GAS OR LIQUID
Filed June 28, 1967    3 Sheets-Sheet 1

INVENTOR,
LEIF RUMP
by Stowell & Stowell
ATTORNEYS

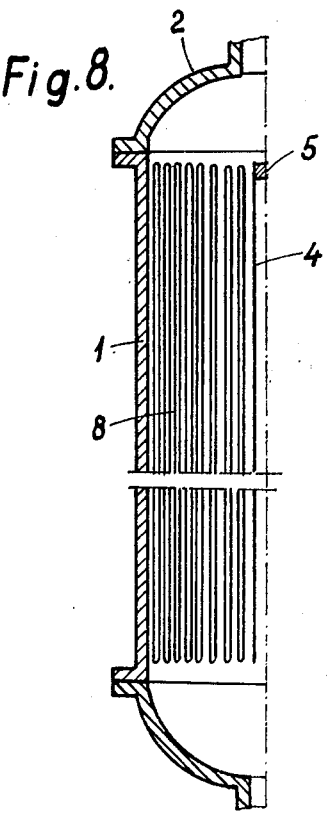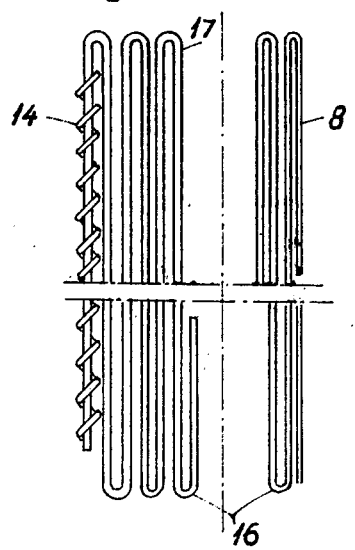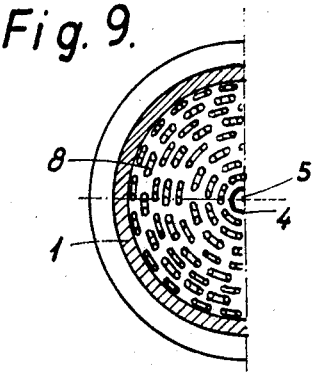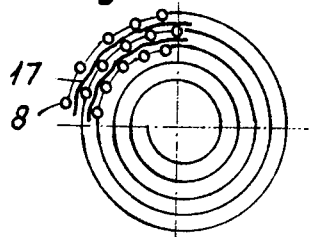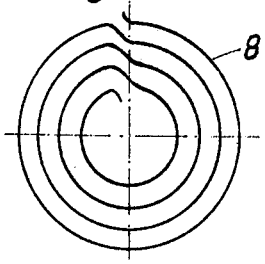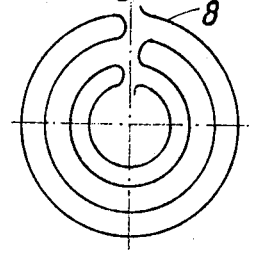

United States Patent Office 3,474,229
Patented Oct. 21, 1969

3,474,229
HEATING ELEMENT FOR ELECTRIC CABLE FURNACES FOR HEATING A FLOW OF GAS OR LIQUID
Leif Rump, Gentofte, Denmark, assignor to Haldor Frederik Axel Topsoe, Vedbaek, Denmark
Filed June 28, 1967, Ser. No. 649,633
Claims priority, application Denmark, June 29, 1966, 3,359/66
Int. Cl. H05b 3/10, 3/44, 3/50
U.S. Cl. 219—552          8 Claims

ABSTRACT OF THE DISCLOSURE

An electric cable furnace for heating liquid or gas consisting of a cable defined by an inner copper conductor surrounded by a steel or Inconel jacket which does not carry any electric current. The space between the conductor and jacket is filled with insulating metal oxide. To reduce space consumption, the cable is coiled and spacer members placed around the runs of cable to define a fixed distance between the runs to provide passage for fluid flow between them and make a solid cable package, suitable for heating gases or fluids to temperatures below 800° C. and for withstanding high pressures and secure long life. The cable is arranged to have reverse direction of electric current in adjacent runs or flights.

---

Figure 1:
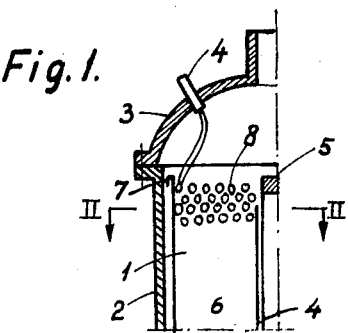

The invention relates to a heating element for an electric cable furnace for heating a flow of gas or liquid, particularly a process gas such as a mixture of hydrogen and nitrogen for the production of ammonia.

It is known to heat process media by passing the same through a heat exchanger in which a heating medium is passed along the opposite sides of the wall of a tube which may be bent in the shape of a hair pin, helices or otherwise. In many cases, however, it is more practical to use electrical heating elements, such as for instance in cases where electricity is available at a low price or where the heating operation has to be ready for being started at short notice. Whereas the usual heat exchangers in which a streaming medium is used for the heat donator must be made by means of relatively short tubes, because the amount of energy which can be taken up or delivered by the medium streaming inside the tube is very limited, there can be used very long conductors for the electric current in electric furnaces. The heating elements can then be made simple and non-spacious.

Electrical heating elements comprising conductors carried by ceramic insulation devices suffer from the drawback that oxide shales and other impurities are apt to deposit on the insulators under the influence of the electrostatic field, whereby short circuiting may arise, by which a heating element may be caused to stop working. To avoid this, electric heating elements for use for the purposes here contemplated have been made in some cases using long electric heating cables in which the conductor is a copper wire insulated from a surrounding jacket which carries no electric current by means of an insulating filling consisting in most cases of a suitable mineral oxide such as magnesium oxide. In a known type of such cable furnaces the jacket is of high alloy steel or Inconel chosen to suit the process conditions in question.

The upper temperature limit is about 800° C. whereas there is practically no limit with respect to the pressure of the process medium. The cables are not influenced as far as their insulation capability are concerned by impurities from the process gas and they can be used for heating liquid media as well as gaseous ones. They can be made in great lengths, such as up to 400 m. and they can be bent sharply. Furthermore they can be used for voltages up to 650 volts and currents depending on the sectional area of the conductor but reaching 100 amp./mm.$^2$ under favourable conditions in practical use.

The known elements of this kind have the heating cable bent in the shape of hair pins which are placed in tubes through which the process medium passes along the cables. The present invention, however, contemplates a heating element in which the heating cable is adapted to be used in a more compact form while still allowing the medium to be heated to pass it in such a manner that it contacts the individual runs or flights of the cable.

For this purpose the invention has for its main object a heating body of the kind mentioned above which consists of an electric cable having a conductor of copper surrounded by a metallic jacket which does not carry electric current, the conductor being insulated from the jacket by means of an insulating mineral filler, for instance a metallic oxide such as magnesium oxide. The said heating body consists in concentric or parallel, cylindrical, spiral or plane shells, in which each run or flight of cable is parallel to its neighbouring runs or flights, and means for keeping the shells in such position to each other as to allow the desired flow, said means consisting in spacing members solely contacting the cable surfaces of the neighbouring runs or flights so as to support them against each other.

Hereby the purpose is attained since a great length of cable may be compacted to a heating body of such form as to be suited for insertion into a tubular furnace and permit the passage of the through-flowing medium in such a manner that it gets into close contact with the individual runs or flights of the cable. In order to prevent the medium passing outside the heating body this must mesh exactly with the furnace, the outer runs or flights of cable being closely adjacent to the wall of the furnace or in contact therewith. It is, however, more suitable to arrange within the furnace wall an additional wall of thinner material having such dimensions and shape that when the heating body is inserted within the wall, the outer runs or flights of cable contact it or are in close proximity thereto, said wall being connected to the furnace wall at one end of the same. In the same manner the interior of the tubular heating body must be filled in for instance with a pipe closed at one end. This filling body may be used for modelling the heating body and may be fixed to the heating body.

According to a preferred embodiment of the invention the spacing elements consist of wires, ribbons or rings placed between the layers of cable. Such spacing elements are able to shape corresponding to the layers of cable, and to secure the position of the cables relative to each other particularly when the runs or flights of the cables in a subsequent layer are as far as possible placed in the interstices between the flights of the cable belonging to a previous layer. The spacers should have a thickness by which the desired through-flow section for the medium to be heated is secured.

A particularly appropriate shape of spacers consists according to an embodiment of the invention of wires wound helically around the cables. The spacers are very easy to place, the winding of the spacing wires around the individual flights of cable being carried out during the shaping of the cable to form the package in question; thus, for instance, the winding of the spacing wire around the cable may be carried out during the winding of the cable if a helical shell has to be produced.

Moreover, it may be appropriate according to the invention not to wind a spacing wire around all the flights of cable but to wind it only around the flights forming every second layer. Hereby it is avoided that the spacing wires get across each other and thereby causes the distance between the flights to be greater than it was intended to be whereby the shape of the package would be irregular or the structure thereof too loose.

In heating bodies of the kind in question hitherto known the heating cables have always been of cylindrical cross section. It is, however, possible in most cases to obtain a substantially improved heat transmission if the heating cables are rolled so as to change the cross section to an oval one which is particularly advantageous when they are placed in such a manner that the process medium flows parallel to the longer axis of the cross section of the cable.

It is a substantial advantage connected with such embodiments that the cables in question are capable of being rolled to give them the oval cross section which corresponds to the optimal heat transmission under the conditions given.

Figure 5:
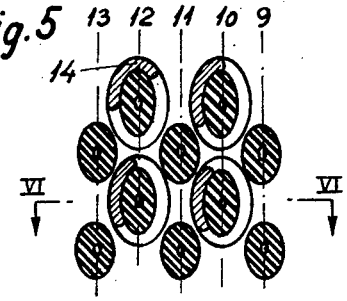
Figure 2:
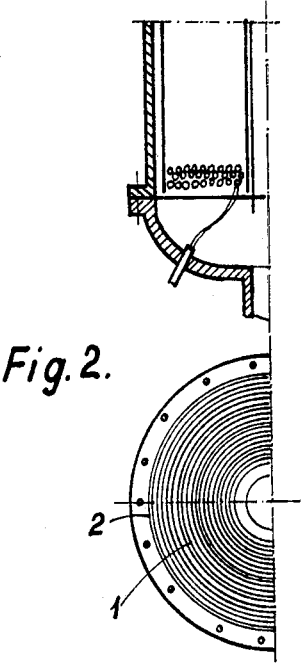
Figure 6:
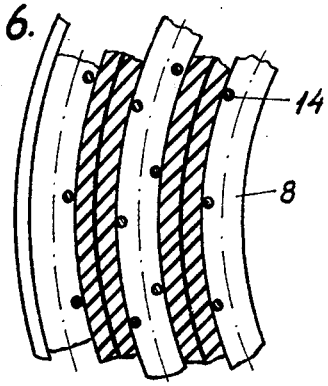
Figure 3:
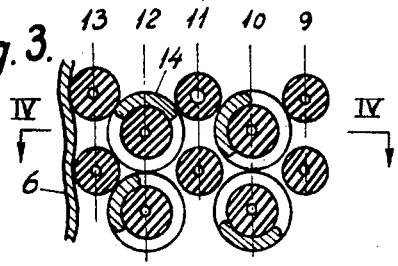
Figure 7:
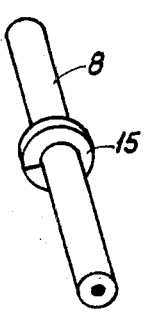
Figure 4:
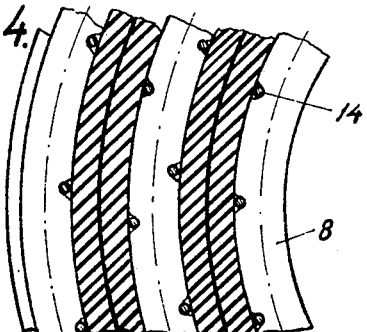

In the following the invention will be explained more in detail by describing a number of embodiments thereof shown in the drawing, in which FIG. 1 shows diagrammatically in axial section an embodiment of the cable furnace according to the invention, and FIG. 2 shows the same embodiment diagrammatically in cross section along the line II—II in FIG. 1, FIG. 3 is a cross-sectional view of the device of FIG. 1, taken at right angles to line II—II of FIG. 1, and may be considered a somewhat magnified view of a portion of FIG. 1, FIG. 4 is a view taken along line IV—IV of FIG. 3, FIG. 5 is a view similar to FIG. 3, showing an embodiment, FIG. 6 is a view taken along line VI—VI of FIG. 5, FIG. 7 shows a cable with another form for the spacing member, FIG. 8 illustrates another embodiment of the cable furnace with heating unit according to the invention and is similar to FIG. 1, FIG. 9 is a cross-section of the device of FIG. 8, and is similar to FIG. 2.

Figure 14:
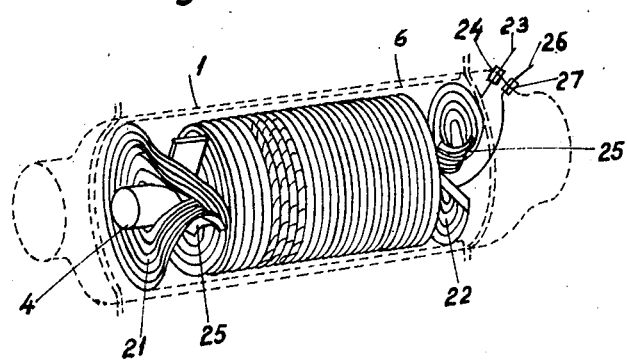
Figure 15:
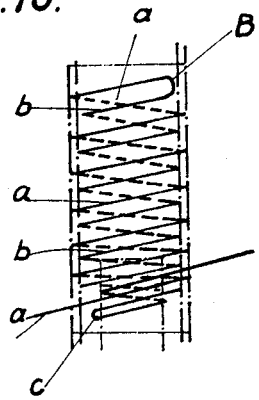

FIG. 10 shows a panel of heat cables for use in the manufacture of the furnace according to FIGS. 6 and 7, FIGS. 11, 12 and 13 show diagrammatically various manners in which the heating cable can be arranged in case of the embodiment illustrated in FIGS. 8 and 9, FIG. 14 is a perspective view of a third embodiment of a package of heating cable, the jacket and furnace being indicated by means of the dotted lines, and FIG. 15 is a diagram showing the runs of cable wound helically in coaxial cylindrical shells so that the column runs in opposite directions within adjacent shells.

Referring now to FIG. 1, the reference numeral 1 designates a package of cables, said package having the shape of a cylindrical tube placed in the interior of a vessel 2 and having a cylindrical core tube 4, which is closed at the top by means of a plug 5 but open at the lower end. On the inside of the cylindrical wall of the vessel 2 has a lining wall 6 connected with the wall 2 of the vessel at 7 adjacent to the top.

The individual runs 8 of the cable are in the shape of spiral turns illustrated approximately in FIG. 2 by way of circles.

FIGS. 3 and 4 show the construction of the cable package 1 more in detail. The windings of the cable are arranged as the windings of a solenoid indicated by broken lines 9–13 in FIG. 3 designating cylindrical or approximately cylindrical surfaces through the axis of the cable runs. The windings or runs 8 of a subsequent layer or shell 10 are placed in the interspaces between the runs of cable of the preceding layer or shell 9. In order to avoid the formation of a powerful magnetic field the cable is wound in such a manner that the direction of the columns in each of two successive shells is opposed to the direction of the current in the other. In the embodiment shown the runs belonging to every second of the shells—in FIG. 3 the shells 10 and 12—are wound or threaded with distance wire 14. When choosing for this purpose an appropriate diameter of the wire 14 the structure of the package becomes open to such a degree that the medium to be heated meets a predetermined resistance during its passage axially through the package via the interspaces between the runs of cable. In FIG. 3 the lining wall 6 is corrugated to suit the runs of cable in the outer shell 13 and prevent the medium escaping from the passage between the runs of the cable by following the wall.

In FIGS. 5 and 6 the arrangement of the cable is the same as in FIGS. 3 and 4 but the cross section of the cable is oval, and the runs arranged in such a manner that the longitudinal axis of the cross sections are parallel to the direction of flow of the medium.

In FIG. 7 is shown a different form of the means for keeping the runs of cable at a predetermined distance from each other, the wire 14 being replaced by a cylindrical collar or nipple 15 adapted to be placed around the cable 8.

In such cases where the resistance against the passage of the medium through the cable furnace is to be reduced to values below the ones which can be attained in a package of the kinds shown in FIGS. 1 and 2, the cables may be bent to form panels as shown in FIG. 10, said panels being arranged and shaped to form a package like the one designated by the reference FIGURE 1 in FIGS. 8 and 9. The flights 8 of cable are shown in cross section in FIG. 9, in longitudinal section in FIG. 8.

FIGS. 11, 12 and 13 illustrate various arrangements in which the panel 16 can be wound so that it forms a cylindrical package of cable. In FIG. 11 the winding is spiral, in FIG. 12 it has a modified spiral shape and in FIG. 13 it is arranged in the shape of cylinders in which the direction of the electric current is reversed for each succeeding shell.

Even in this case the means for keeping the flights at a desired mutual distance may consist of winding or threading with distance wire as in FIGS. 4–6, but a different arrangement is shown in connection with some of the flights of the panel of FIG. 10, and consists in wires or ribbons introduced with certain intervals between the cylindric shells as shown in FIG. 11.

In FIG. 14 a rather short package of heating cable of relatively large diameter is shown in perspective as placed in a container, the contours of which are shown in broken lines. Several such containers may be placed in series or parallel.

The package formed by one cable consists of a coil portion 20 with a central tube 4 closed at one end in the middle of it and two loop portions 21 and 22 at the ends thereof. The coil is built up by cylindrical shells of cable around which a distance wire as shown for instance in FIGS. 3, 4 and 10 has been wound. In each shell the turns or runs of cable are placed helically as close as permitted by the distance wire. One terminal 23 extends from and continues the first turn of the innermost shell and is passed through the wall of the container 1 by means of an insulator 24. At the other end of the innermost shell a flat loop is formed and together with other loops extending from the other shells is formed to a flat layer of loops 21. Each loop starts from one shell and follows the other loops one turn round, whereupon it is bent around a bend-supporting arm 25 extending radially from the central tube 4. The cable then continues to form the next shell, in which accordingly the electric current will pass in opposite direction to that in which it has passed the innermost shell. The said next shell is also helical and its runs are parallel to those of the innermost shell. Accordingly each run can be placed in the intervals between the runs of the innermost shell, the cable being in contact with the distance-defining means such as distance wire surrounding the cable. There may be two or three other radially extending arms like 25 to define the distance between the flat assembly of loops 21 and the end of the coil portion 20. Similar loops are formed at the other end and placed and supported in similar manner.

FIG. 15 shows schematically one set of helical windings *a* and a previous set *b* and shows that when a bend B and another bend C is made at each end of the coil the parallellity of the runs will be secured and the current will run in alternate directions in the runs. One direction of the current is indicated by arrows. The bends B and C correspond to the assembly of loops 21 and 22 in FIG. 14.

25 and 26 are a terminal and an insulator respectively at the other end of the cable.

Obviously, the bends B and C may be formed and placed in many other ways than shown in FIG. 14, which, however, illustrates a convenient form which does not interfere with the close packing of the lengths of cable contained in the coil portion 20.

I claim:
1. An electric heating device including
   (a) an electric conductor centrally positioned in a tubular metallic jacket, the space between the conductor and the jacket being filled with an electrically insulating filler,
   (b) the conductor and surrounding jacket being wound to define layers which are positioned within a vessel through which fluid is adapted to be passed and heated,
   (c) spacing elements placed along portions of the jacket runs and contacting the external surfaces thereof,
   (d) said spacing elements extending outwardly from the jacket and adapted to abut adjacent jacket runs so as to maintain them spaced from each other and to thereby admit the passage of fluid therebetween.
2. The device of claim 1 wherein said tubular jacket is of oval cross-section, and wherein the electrical conductor and jacket are wound so that the various runs thereof form a cylindrical outline of conductors, the longer axis of the oval cross-section being parallel to the longitudinal axis of the cylindrical outline.
3. The device of claim 1 wherein said spacing elements are defined by ribbons.
4. The device of claim 3 wherein said tubular jacket is of oval cross-section, and wherein the electrical conductor and jacket are wound so that the various runs thereof form a cylindrical outline of conductors, the longer axis of the oval cross-section being parallel to the longitudinal axis of the cylindrical outline.
5. The device of claim 1 wherein said spacing elements are defined by wires helically wrapped on alternate run layers.
6. The device of claim 5 wherein said tubular jacket is of oval cross-section, and wherein the electrical conductor and jacket are wound so that the various runs thereof form a cylindrical outline of conductors, the longer axis of the oval cross-section being parallel to the longitudinal axis of the cylindrical outline.
7. The device of claim 1 wherein said spacing elements are defined by rings placed along said runs.
8. The device of claim 7 wherein said tubular jacket is of oval cross-section, and wherein the electrical conductor and jacket are wound so that the various runs thereof form a cylindrical outline of conductors, the longer axis of the oval cross-section being parallel to the longitudinal axis of the cylindrical outline.

References Cited
UNITED STATES PATENTS

| | | | |
|---|---|---|---|
| 2,941,123 | 6/1960 | Grebe | 317—100 |
| 3,032,635 | 5/1962 | Kraft | 219—553 X |
| 3,038,057 | 6/1962 | Bok et al. | 219—272 |
| 3,056,846 | 10/1962 | Glaser | 13—20 |
| 3,065,436 | 11/1962 | Kayko et al. | 338—243 |
| 3,265,865 | 8/1966 | Hager | 219—549 |
| 3,371,192 | 2/1968 | Rosenel | 219—523 |

VOLODYMYR Y. MAYEWSKY, Primary Examiner

U.S. Cl. X.R.

219—375, 544